(12) United States Patent
Stone et al.

(10) Patent No.: US 7,920,623 B2
(45) Date of Patent: Apr. 5, 2011

(54) METHOD AND APPARATUS FOR SIMULTANEOUS DISPLAY OF MULTIPLE AUDIO/VIDEO PROGRAMS TRANSMITTED OVER A DIGITAL LINK

(75) Inventors: Christopher J. Stone, Newtown, PA (US); Stephen A. Allinson, Langhorne, PA (US); Christopher S. Del Sordo, Souderton, PA (US); Brad T. Howard, Lawrenceville, GA (US); Terry L. Ziegler, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 1878 days.

(21) Appl. No.: 10/714,236

(22) Filed: Nov. 14, 2003

(65) Prior Publication Data

US 2005/0108778 A1      May 19, 2005

(51) Int. Cl.
*H04N 7/12*         (2006.01)
*H04N 7/173*        (2006.01)

(52) U.S. Cl. ................................ 375/240.01; 725/90

(58) Field of Classification Search .................. 382/240, 382/232; 386/125, 126, 111, 112, 46, 68, 386/96, 83; 375/240.26, 240.24, 240.16, 375/240.12, 240.1, 240; 348/564, 565, 567, 348/568, 588, 598, 724, 469, 705, 723, 743; 725/90, 89, 102, 88
See application file for complete search history.

(56) References Cited

U.S. PATENT DOCUMENTS

| 5,586,264 | A | * | 12/1996 | Belknap et al. | 725/115 |
| 5,625,410 | A | * | 4/1997 | Washino et al. | 348/154 |
| 5,796,945 | A | * | 8/1998 | Tarabella | 709/219 |
| 5,847,771 | A | * | 12/1998 | Cloutier et al. | 348/564 |
| 5,877,821 | A | * | 3/1999 | Newlin et al. | 348/724 |
| 6,035,037 | A | | 3/2000 | Chaney | |
| 6,510,553 | B1 | * | 1/2003 | Hazra | 725/87 |
| 6,549,528 | B2 | * | 4/2003 | Yuzawa | 370/345 |
| 6,671,290 | B1 | * | 12/2003 | Murayama et al. | 370/486 |
| 7,072,948 | B2 | * | 7/2006 | Yen et al. | 709/218 |
| 2003/0093800 | A1 | * | 5/2003 | Demas et al. | 725/90 |
| 2005/0259751 | A1 | * | 11/2005 | Howard et al. | 375/240.26 |

* cited by examiner

*Primary Examiner* — Behrooz Senfi
(74) *Attorney, Agent, or Firm* — Larry T. Cullen

(57) ABSTRACT

Simultaneous display of multiple audio/video (AV) programs transmitted over a digital link is described. At a source device, at least one non-composited digital transport stream is generated from the plurality of AV programs. The at least one non-composited digital transport stream is augmented with control information. The control information is operative to invoke simultaneous display of the plurality of AV programs on a display device. The at least one non-composited digital transport stream is then transmitted as augmented over the digital link. At a sink device, at least one non-composited digital transport stream having the plurality of AV programs is received over the digital link. Control information is extracted from the at least one non-composited digital transport stream. The plurality of AV programs are identified within said non-composited digital transport stream in response to the control information. The identified AV programs are then simultaneously displayed on the display device.

28 Claims, 4 Drawing Sheets

METHOD AND APPARATUS FOR SIMULTANEOUS DISPLAY OF MULTIPLE AUDIO/VIDEO PROGRAMS TRANSMITTED OVER A DIGITAL LINK

BACKGROUND OF THE INVENTION

1. Field of the Invention

The present invention generally relates to audio/video systems and, more particularly, to simultaneous display of multiple audio/video programs transmitted over a digital link.

2. Description of the Related Art

Recently, high definition televisions (HDTVs) with digital interfaces, such as an IEEE 1394 bus interface, have appeared on the market. The IEEE 1394 bus (also referred to as FireWire, iLink, or DTV-Link) is a high-speed serial bus for transmitting digital data. In a typical configuration, a user employs an external tuning device, such as a set-top box (STB), to receive audio/video (AV) signals from a cable or satellite operator, or from a terrestrial broadcast. The STB, or "source device", tunes to a particular AV signal to receive an AV stream, which is coupled to the digital bus. For example, the AV stream may include compressed AV data in accordance with the MPEG (Moving Pictures Expert Group) standard and the source device may output an MPEG-2 transport stream to the digital bus. The HDTV, or "sink device", receives the AV stream over the digital bus, decodes the AV data therein, and displays the decoded AV data. By employing a digital bus, a source/sink system reduces or eliminates noise and other deleterious effects typically associated with analog transmission.

Use of an IEEE 1394 bus to transmit an AV stream between a source device and sink device is in its infancy and there are several drawbacks in its operation. One such drawback is the inability to properly display multiple AV streams simultaneously, known as picture-in-picture (PIP), or picture-over-picture (POP). PIP/POP functionality includes the ability to display a first selected AV stream in a larger portion of a television screen and a second selected AV stream in a smaller portion of the television screen. PIP/POP functionality allows the user to watch a primary AV stream in the full screen of the television, while monitoring a secondary AV stream in the smaller PIP/POP window, which typically overlays a portion of the full screen view.

Currently, there is no defined manner for a sink device (e.g., HDTV) receiving multiple AV streams over an IEEE 1394 bus to know that the user is requesting a PIP/POP session or that the multiple AV streams are intended for a PIP/POP session. This leaves the user with expensive state-of-the-art equipment that does not include simple PIP/POP functionality. Accordingly, there exists a need in the art for a mechanism to simultaneously display multiple AV streams transmitted over a digital link between a source device and a sink device.

SUMMARY OF THE INVENTION

A method and apparatus for simultaneous display of multiple audio/video (AV) programs transmitted over a digital link is described. One aspect of the invention relates to a method of encoding a plurality of AV programs for simultaneous display on a display device. In one embodiment, at least one non-composited digital transport stream is generated from the plurality of AV programs. The at least one non-composited digital transport stream is augmented with control information. The control information is operative to invoke simultaneous display of the plurality of AV programs on the display device. The at least one non-composited digital transport stream is then transmitted over the digital link.

Another aspect of the invention relates to a method of decoding a non-composited digital transport stream having a plurality AV programs configured for simultaneous display at a display device. In one embodiment, at least one non-composited digital transport stream having the plurality of AV programs is received over the digital link. Control information is extracted from the at least one non-composited digital transport stream. The plurality of AV programs are identified within said non-composited digital transport stream in response to the control information. The identified AV programs are then simultaneously displayed on the display device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Simultaneous display of multiple audio/video (AV) programs transmitted over a digital link is described. One or more aspects of the invention are described with respect to an MPEG (Moving Pictures Expert Group) transport carrying AV programs over an IEEE 1394 bus. Those skilled in the art will appreciate that the invention may be used with other types of digital transport streams comprising time-division multiplexed (TDM) or packet division multiplexed (PDM) data. In addition, those skilled in the art will appreciate that the invention may be used with other types of digital buses, such as a universal serial bus (USB) and the like.

Figure 1:
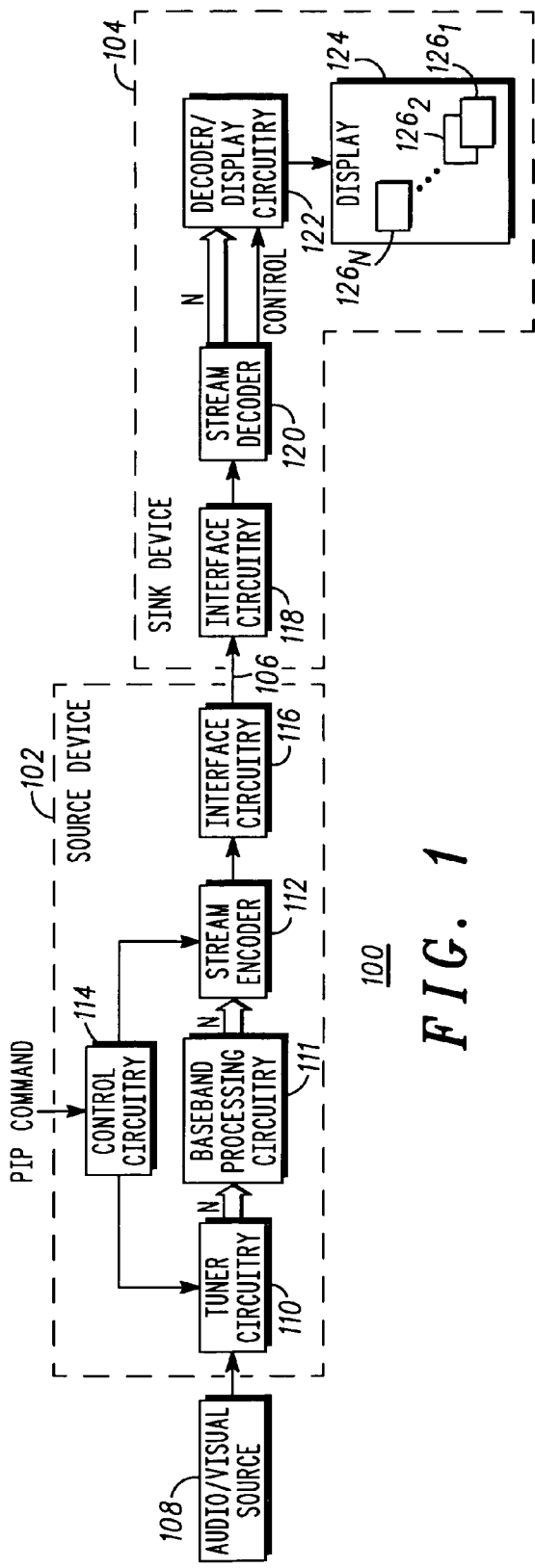
FIG. 1 is a block diagram depicting an exemplary embodiment of an audio/video (AV) system.

FIG. 1 is a block diagram depicting an exemplary embodiment of an audio/video (AV) system 100. The AV system 100 comprises a source device 102, a sink device 104, and a digital link 106 connecting the source device 102 to the sink device 104. The source device 102 is coupled to an AV source 108 for receiving AV signals therefrom. Each AV signal includes an AV program or service comprising one or more of audio, video, and data (generally referred to herein as an "AV program"). The AV source 108 may comprise an interface to any type of audio/video/data signal transmission source, such as land-based radio-frequency type broadcast networks, cable networks, space satellite signal transmission networks, broadband telephone networks, and the like. The transmitted AV programs may be in any type of digital transport stream format suitable for transmission purposes, such as the MPEG format, including MPEG-2 as defined in ISO/IEC Standard 13818, the digital satellite systems (DSS) format, the asynchronous transfer mode (ATM) format, and the like.

The source device 102 comprises tuner circuitry 110, baseband processing circuitry 111, a stream or transport encoder ("stream encoder 112"), control circuitry 114, and interface circuitry 116. For example, the source device 102 may be a set-top box (STB), video cassette recorder (VCR), receiver, or like type tuning device known in the art. An input terminal of the tuner circuitry 110 is coupled to the AV source 108 for receiving AV signals. The tuner circuitry 110 selects and tunes N of the AV signals in a well known manner, where N is an integer greater than zero. For example, the tuner circuitry 110 may include dual tuners for tuning a first AV signal and a second AV signal of the AV signals provided by the AV source 108 (i.e., N=2). An output bus of the tuner circuitry 110 provides the N tuned AV signals.

Another input terminal of the tuner circuitry 110 is coupled to the control circuitry 114 for receiving commands therefrom. The control circuitry 114 controls the both the selection and the number of AV signals that are tuned by the tuner circuitry 110 in response to commands from the user. Notably, in response to a picture-in-picture (PIP) command from the user, the control circuitry 114 commands the tuner circuitry 110 to simultaneously tune a plurality of AV signals (e.g., two AV signals for a dual program PIP session).

An input bus of the baseband processing circuitry 111 is coupled to the output bus of the tuner circuitry 110 for receiving the N tuned AV signals. The baseband processing circuitry 111 recovers an AV program from each of the tuned AV signals in a well known manner. The baseband processing circuitry 111 provides N recovered AV programs corresponding to the N tuned AV signals as output. As described above, the recovered AV programs may be in any known format, including known digital transport stream formats, such as those complying with the MPEG-2 systems standard.

An input bus of the stream encoder 112 is coupled to the output bus of the baseband processing circuitry 110 for receiving the N recovered AV programs. The stream encoder 112 encodes the AV programs to generate one or more non-composited digital transport streams as output for transmission to the sink device 104. As used herein, the term "non-composited" means that given digital transport stream comprises a plurality of separate AV streams that are multiplexed, rather than a single video stream that contains a single video image formed by layering multiple video images and a single audio stream that contains a single audio track formed by mixing multiple audio tracks. The digital transport stream(s) produced by the stream encoder 112 may be any type of digital transport or program stream(s) known in the art. For purposes of clarity by example, embodiments of the invention will be described with respect to MPEG-2 transport streams.

Another input terminal of the stream encoder 112 is coupled to the control circuitry 114. In response to a PIP command from the user, the control circuitry 114 commands the stream encoder 112 to encode the AV programs in a manner establishing a PIP session. Notably, the stream encoder 112 augments the data stream(s) with control information operative to invoke simultaneous display of the N recovered AV programs on the sink device 104. An embodiment of the stream decoder 112 is described below.

An input bus of the interface circuitry 116 is coupled to the output bus of the stream encoder 112 for receiving the digital transport stream(s). The interface circuitry 116 processes the digital transport stream(s) for transmission over the digital link 106 in a well known manner. For example, in one embodiment, the digital link 106 is an IEEE 1394 bus and the interface circuitry 116 processes the digital transport stream(s) for transmission in accordance with the IEEE 1394 protocol.

The sink device 104 comprises interface circuitry 118, a stream or transport decoder ("stream decoder 120"), decoder/display circuitry 122, and a display 124. For example, the sink device 104 may be a television (e.g., high-definition television (HDTV)), monitor, or like type display device known in the art. An input bus of the interface circuitry 118 is coupled to the digital link 106 for receiving the digital transport stream(s) generated by the source device 102. The interface circuitry 118 provides the digital transport stream(s) to an input bus of the stream decoder 120. The stream decoder 120 extracts the control information within the digital transport stream(s). Notably, the stream decoder 120 uses the control information to identify an invocation of a PIP session by the user and to recover the AV programs within the digital transport stream(s) for the PIP session. An output bus of the stream decoder 120 provides the N recovered AV programs, as well as the control information. An embodiment of the stream decoder 120 is described below.

An input bus of the decoder/display circuitry 122 is coupled to the output bus of the stream decoder 120 for receiving the control information and the N recovered AV programs. The decoder/display circuitry 122 decodes the AV data within each AV program in a well known manner. For example, if an AV program comprises compressed AV data in accordance with the MPEG standard, the decoder/display circuitry 122 comprises an MPEG decoder for decoding the audio, video, and/or data within each AV program. The decoder/display circuitry 122 uses the control information to display the AV programs on the display 124. The display 124 may be defined by N regions $126_1$ through $126_N$ in which each of the N recovered AV programs are to be displayed. For example, if a dual PIP session has been invoked by the user, the control information recovered by the stream decoder 120 is used to determine which of the two AV programs is to be displayed in a primary region, and which of the two AV programs is to be displayed in a secondary region.

Figure 2:
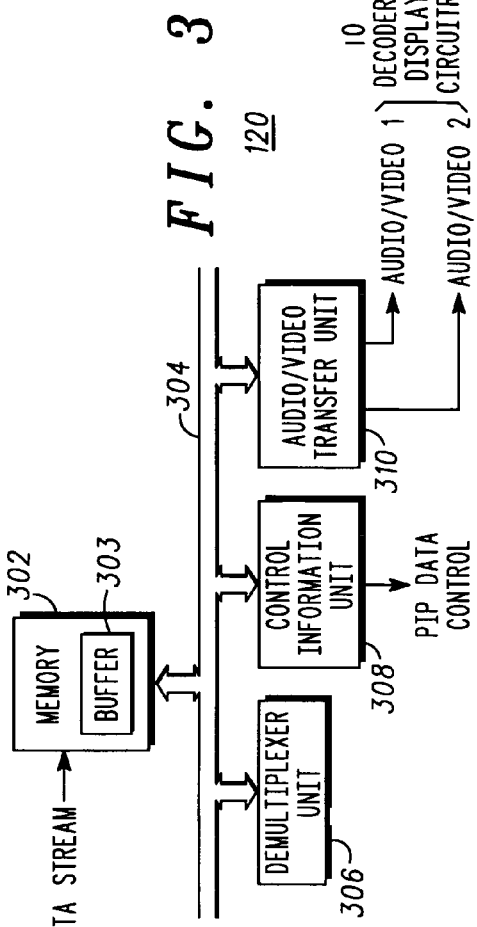
FIG. 2 is a block diagram depicting an exemplary embodiment of a stream encoder for use with the AV system shown in FIG. 1.

FIG. 2 is a block diagram depicting an exemplary embodiment of the stream encoder 112 shown in FIG. 1. For purposes of clarity by example, the stream encoder 112 is described as having two separate AV programs as input, where a first AV program comprises first video data ("video 1") and first audio data ("audio 1"), and a second AV program comprises second video data ("video 2") and second audio data ("audio 2"). Those skilled in the art will appreciate that the stream encoder 112 may have any number of AV programs as input, such AV programs comprising video, audio, and/or data. The stream encoder 112 illustratively comprises a bus 204 coupled to a memory 202, a multiplexer unit 206, a control information unit 208, and a transport stream transfer unit 210. An input bus of the memory 202 is coupled to receive the AV programs. For example, at least a portion of the memory 202 may comprise a buffer 203, such as a first-in-first-out (FIFO) buffer, for buffering the data within each of the AV programs. An output bus of the memory 202 is coupled to the bus 204.

An input/output bus of the multiplexer unit 206 is coupled to the bus 204. The multiplexer unit 206 may be used to multiplex the video and audio data of the AV programs, as well as the AV programs themselves, to form one or more non-composited digital transport streams. An input/output bus of the control information unit 208 is coupled to the bus 204. Another input terminal of the control information unit 208 is coupled to receive PIP command data. In response to a PIP command, the control information unit 208 may augment the non-composited digital transport stream(s) generated by the multiplexer unit 206 with control information in order to identify a PIP session and to distinguish among the different AV programs for display. An input bus of the transport stream transfer unit 210 is coupled to the bus 204. The transport stream transfer unit 210 is configured to provide the non-composited digital transport stream(s) as output for the stream encoder 112. Embodiments of operation of the stream encoder 112 are described below.

Figure 3:
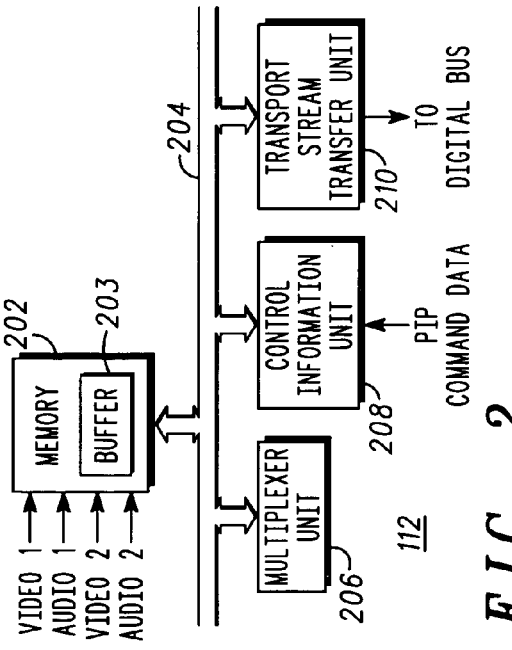
FIG. 3 is a block diagram depicting an exemplary embodiment of a stream decoder for use with the AV system shown in FIG. 1.

FIG. 3 is a block diagram depicting an exemplary embodiment of the stream decoder 120 of FIG. 1. For purposes of clarity by example, the stream decoder 120 is described as having two separate AV programs as output, where a first AV program comprises first video data ("video 1") and first audio data ("audio 1"), and a second AV program comprises second video data ("video 2") and second audio data ("audio 2"). Those skilled in the art will appreciate that the stream decoder 120 may output any number of AV programs depending on the number of AV programs transmitted within the digital transport stream(s), such AV programs comprising video, audio, and/or data. The stream decoder 120 illustratively comprises a bus 304 coupled to a memory 302, a demultiplexer unit 306, a control information analyzer 308, and an AV transfer unit 310. An input bus of the memory 302 is coupled to receive one or more digital transport streams. For example, at least a portion of the memory 302 may comprise a buffer 303, such as a FIFO buffer, for buffering the data within each of the digital transport streams. An output bus of the memory 302 is coupled to the bus 304.

An input/output bus of the control information analyzer 308 is coupled to the bus 304. The control information analyzer 308 extracts control information from the digital transport stream(s) stored within the memory 302. An input/output bus of the demultiplexer unit 306 is coupled to the bus 304. The demultiplexer unit 306 may use the control information extracted by the control information analyzer 308 to recover the AV programs from the non-composited digital transport stream(s). An input bus of the AV transfer unit 310 is coupled to the bus 304. The AV transfer unit 310 is configured to provide the AV programs as output for the stream decoder 120. Embodiments of operation of the stream decoder 120 are described below.

Figure 4:
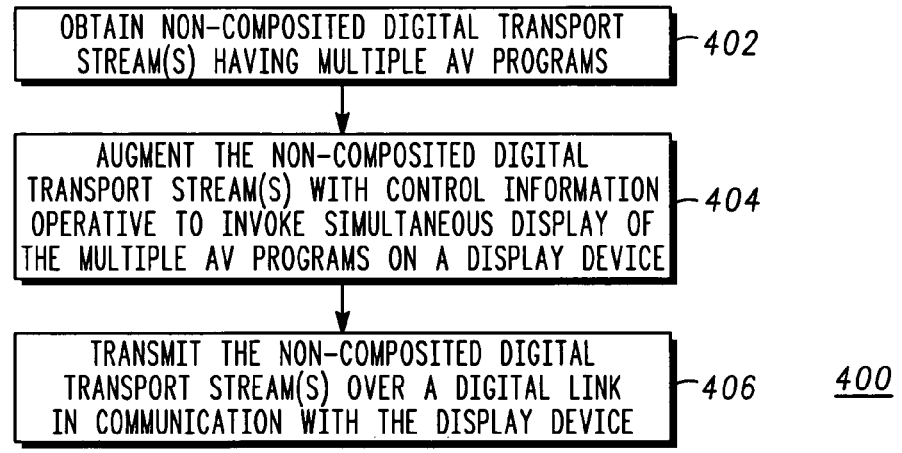
FIG. 4 is a flow diagram depicting an exemplary embodiment of a process for encoding AV programs for simultaneous display on a display device.

FIG. 4 is a flow diagram depicting an exemplary embodiment of a process or method ("process 400") for encoding AV programs for simultaneous display on a display device. The process 400 may be performed by the stream encoder 112 described above. The process 400 begins at step 402, where at least one non-composited digital transport stream is obtained. In one embodiment, the non-composited digital transport stream(s) is generated having a plurality of AV programs. For example, a single non-composited digital transport stream is generated having a single program stream, where the single program stream is generated by multiplexing the plurality of AV programs. Alternatively, a single non-composited digital transport stream is generated having a plurality of program streams, where each program stream represents one of the AV programs. In yet another example, multiple non-composited digital transport streams may be generated, each of which comprises a single program stream representing one of the AV programs. Examples illustrating these embodiments are described below with respect to FIGS. 6-9. In another embodiment of the invention, the non-composited digital transport stream(s) having multiple AV programs are recovered from received AV signals.

At step 404, the non-composited digital transport stream(s) is augmented with control information operative to invoke simultaneous display of the AV programs on a display device. The control information is configured to allow a display device to determine that the user has requested a PIP session. In addition, the control information allows the display device to distinguish among the different AV programs within the non-composited digital transport stream(s) for display in their respective regions defined by the display device. In one embodiment, the control information is disposed within control packets associated with a program stream within the transport stream ("program control packets"). For example, if the transport stream is an MPEG transport stream, then the control information may be disposed within a program map table (PMT). In another embodiment, the control information is disposed within control packets associated with the transport stream ("stream control packets"). For example, if the transport stream is an MPEG transport stream, then the control information may be disposed within a program association table (PAT). In yet another embodiment, the control information comprises a command that is multiplexed with the digital transport stream(s). Examples illustrating these embodiments are described below with respect to FIGS. 6-9. At step 406, the non-composited digital transport stream(s) are transmitted over a digital link in communication with the display device.

Figure 5:
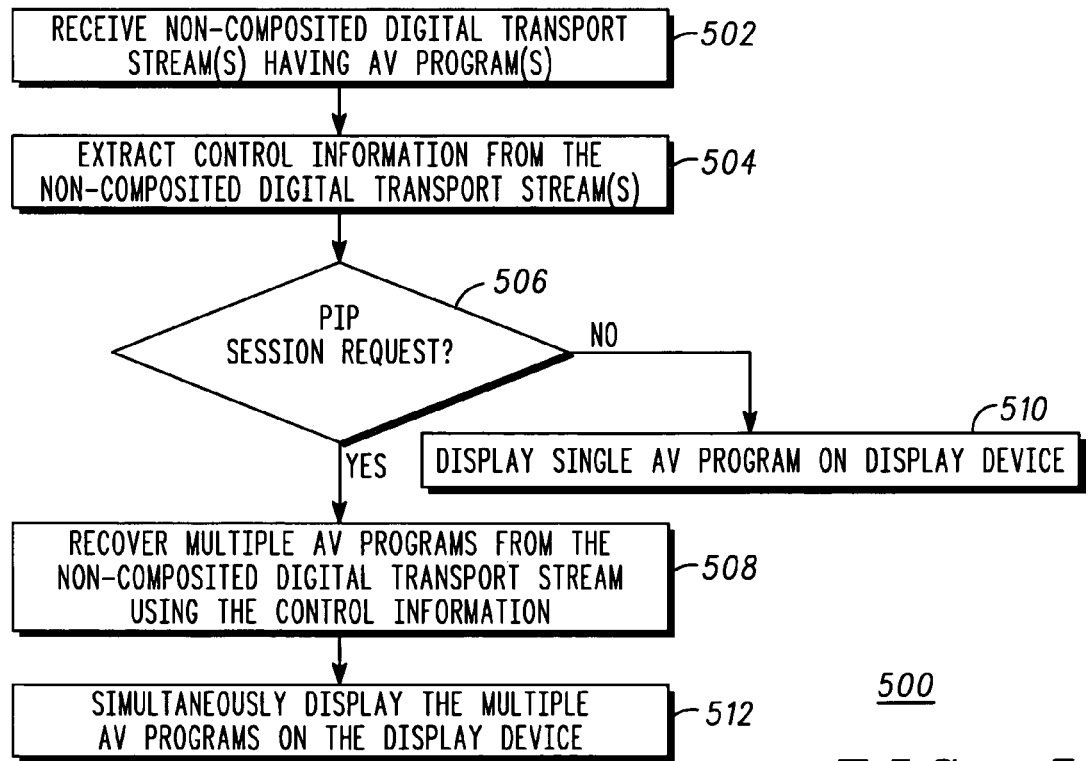
FIG. 5 is a flow diagram depicting an exemplary embodiment of a process for decoding one or more digital transport streams produced by the encoding process of FIG. 4.

FIG. 5 is a flow diagram depicting an exemplary embodiment of a process or method ("process 500") for decoding one or more digital transport streams produced by the process 400. The process 500 may be performed by the stream decoder 120 described above. The process 500 begins at step 502, where at least one non-composited digital transport stream having a plurality of AV programs is received. At step 504, control information is extracted from the non-composited digital transport stream(s). As described above, the control information may be disposed in particular control packets (e.g., stream control packets or program control packets), or may be part of a command multiplexed with the non-composited digital transport stream(s). At step 506, a determination is made as to whether a PIP session has been requested. If the control information indicates that the non-composited digital transport stream(s) contain a plurality of AV programs, then the process 500 proceeds to step 508. Otherwise, the process proceeds to step 510, where an AV program is recovered from the transport stream and displayed on the display device. At step 508, the plurality of AV programs are recovered from the non-composited digital transport stream(s)

using the control information. At step 512, the AV streams are simultaneously displayed within regions defined by the display device.

Figure 6:
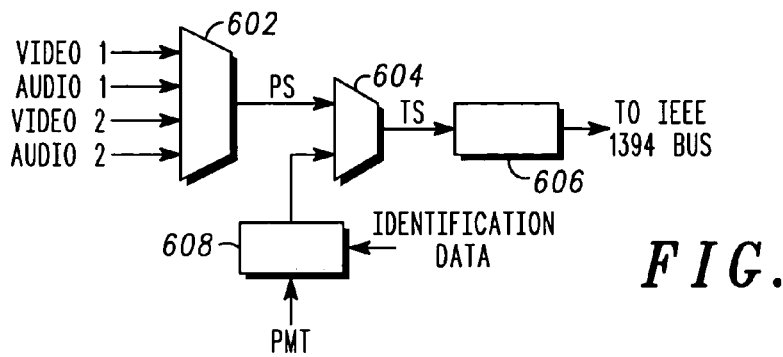
FIG. 6 is a data flow diagram depicting an example of the encoding process of FIG. 4 for two separate AV programs each having a video component and an audio component.

FIG. 6 is a data flow diagram depicting an example of the encoding process 400 for two separate AV programs each having a video component and an audio component. A first AV program comprises first video data ("video 1") and first audio data ("audio 1"), and a second AV program comprises second video data ("video 2") and second audio data ("audio 2"). The video and audio components of each of the AV programs are multiplexed at step 602 to produce a single non-composited program stream (PS). The non-composited program stream is multiplexed with program specific information (PSI) at step 604 to produce an MPEG-2 transport stream. The PSI defines control information for the transport stream. In particular, the PSI includes a single PMT associated with the non-composited stream comprising the two AV programs. At step 606, the MPEG-2 transport stream is processed for transmission over an IEEE 1394 bus.

In order for the display device to distinguish among the two AV programs, the PMT is augmented at step 608 to include identification data. In one embodiment, the identification data is disposed in a program level descriptor of the PMT. The descriptor may comprise a plurality of fields, such as a descriptor tag for identification, a descriptor length to store the length of the descriptor in bits, the identification data, and one or more reserved fields. The identification data may comprise packet identifiers (PIDs) associated with packets defining the different AV programs. For example, the identification data may comprise a PID for video 1, a PID for audio 1, a PID for video 2, and a PID for audio 2. In this manner, the display device will be able to determine an invocation of a PIP session and distinguish among the different AV programs within the MPEG transport stream.

Figure 7:
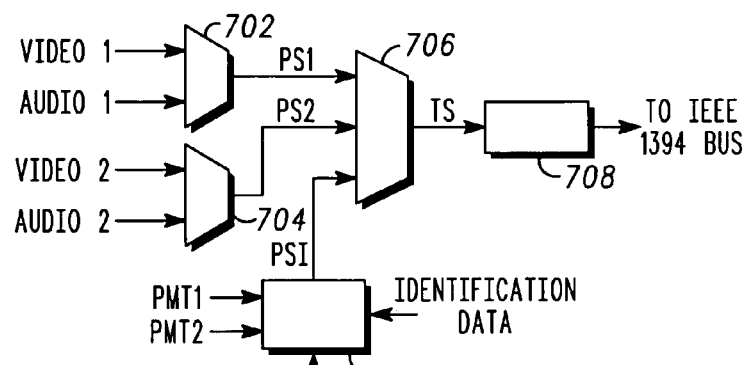
FIG. 7 is a data flow diagram depicting another example of the encoding process of FIG. 4 for two separate AV programs each having a video component and an audio component.

FIG. 7 is a data flow diagram depicting an example of the process 400 for two separate AV programs each having a video component and an audio component. A first AV program comprises first video data ("video 1") and first audio data ("audio 1"), and a second AV program comprises second video data ("video 2") and second audio data ("audio 2"). The video and audio components of the first AV program are multiplexed at step 702 to produce a first program stream. The video and audio components of the second AV program are multiplexed at step 704 to produce a second program stream. The first and second program streams are multiplexed with PSI at step 706 to produce an MPEG-2 transport stream. The PSI defines control information for the transport stream. In particular, the PSI includes a single PAT associated with the transport stream, a first PMT associated with the first program stream, and a second PMT associated with the second program stream. At step 708, the MPEG-2 transport stream is processed for transmission over an IEEE 1394 bus.

In order for the display device to distinguish among the two AV programs, the PAT is augmented at step 710 to include identification data. In one embodiment, the identification data is private data disposed in an adaptation field of the PAT. The adaptation field may comprise a plurality of fields, such as an adaptation field length for storing the length of the adaptation field in bits, one or more private data fields, one or more reserved data fields, and the identification data. The identification data may comprise PIDs associated with packets defining the first and second PMTs. In this manner, the display device will be able to determine an invocation of a PIP session and distinguish among the different AV programs within the MPEG transport stream.

Figure 8:
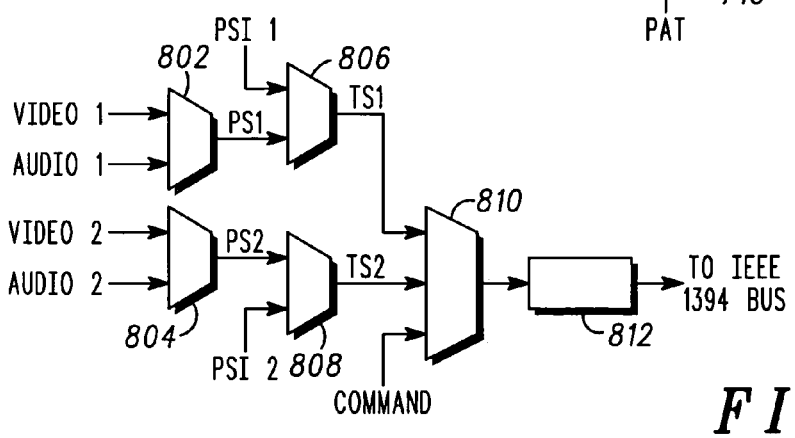
FIG. 8 is a data flow diagram depicting another example of the encoding process of FIG. 4 for two separate AV programs each having a video component and an audio component.

FIG. 8 is a data flow diagram depicting another example of the process 400 for two separate AV programs each having a video component and an audio component. A first AV program comprises first video data ("video 1") and first audio data ("audio 1"), and a second AV program comprises second video data ("video 2") and second audio data ("audio 2"). The video and audio components of the first AV program are multiplexed at step 802 to produce a first program stream. The video and audio components of the second AV program are multiplexed at step 804 to produce a second program stream. The first program stream is multiplexed with PSI at step 806 to produce a first MPEG-2 transport stream. The second program stream is multiplexed with PSI at step 808 to produce a second MPEG-2 transport stream. The first and second MPEG-2 transport streams are multiplexed with a command at step 810 and processed for transmission over the IEEE 1394 bus at step 812.

The command includes identification data used to identify a PIP session at the display device and to distinguish among the different AV programs. In one embodiment, the command comprises an operational code configured to invoke a PIP session at a sink device and a pair of source and destination plugs associated with each of the AV programs. That is, for a particular AV program, a source plug indicates which of the two MPEG transport streams contains the AV program, and a destination plug indicates which of the regions defined by the display device to display the particular AV program. For example, the command may comprise a pair of source and destination plugs for audio/video 1 and a pair of source and destination plugs for audio/video 2. In this manner, the display device will be able to determine an invocation of a PIP session and distinguish among the different AV programs within the MPEG transport streams. In one embodiment, the command is formatted in accordance with the enhanced AV command and control architecture (AV/C) defined by the IEEE 1394 Trade Association (TA).

Figure 9:
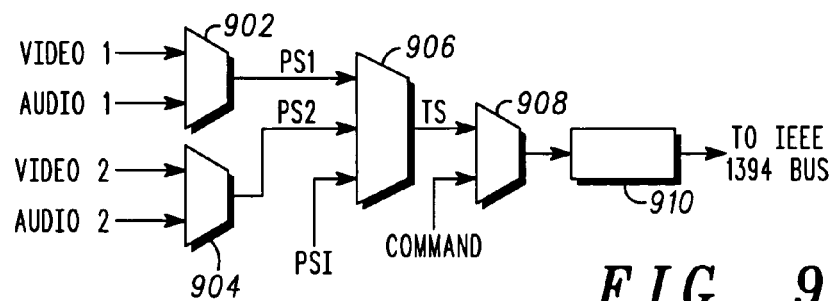
FIG. 9 is a data flow diagram depicting yet another example of the encoding process of FIG. 4 for two separate AV programs each having a video component and an audio component.

FIG. 9 is a data flow diagram depicting yet another example of the process 400 for two separate AV programs each having a video component and an audio component. A first AV program comprises first video data ("video 1") and first audio data ("audio 1"), and a second AV program comprises second video data ("video 2") and second audio data ("audio 2"). The video and audio components of the first AV program are multiplexed at step 902 to produce a first program stream. The video and audio components of the second AV program are multiplexed at step 904 to produce a second program stream. The first and second program streams are multiplexed with PSI at step 906 to produce an MPEG-2 transport stream. The MPEG-2 transport stream is multiplexed with a command at step 908 and processed for transmission over the IEEE 1394 bus at step 910.

The command may be substantially similar to the command described above with respect to FIG. 8. Notably, in one embodiment, the command comprises an operational code configured to invoke a PIP session at a sink device and a pair of source and destination plugs associated with each of the AV programs. That is, for a particular AV program, a source plug indicates which of the two program streams in the MPEG transport stream contains the AV program, and a destination plug indicates which of the regions defined by the display device to display the particular AV program.

Figure 10:
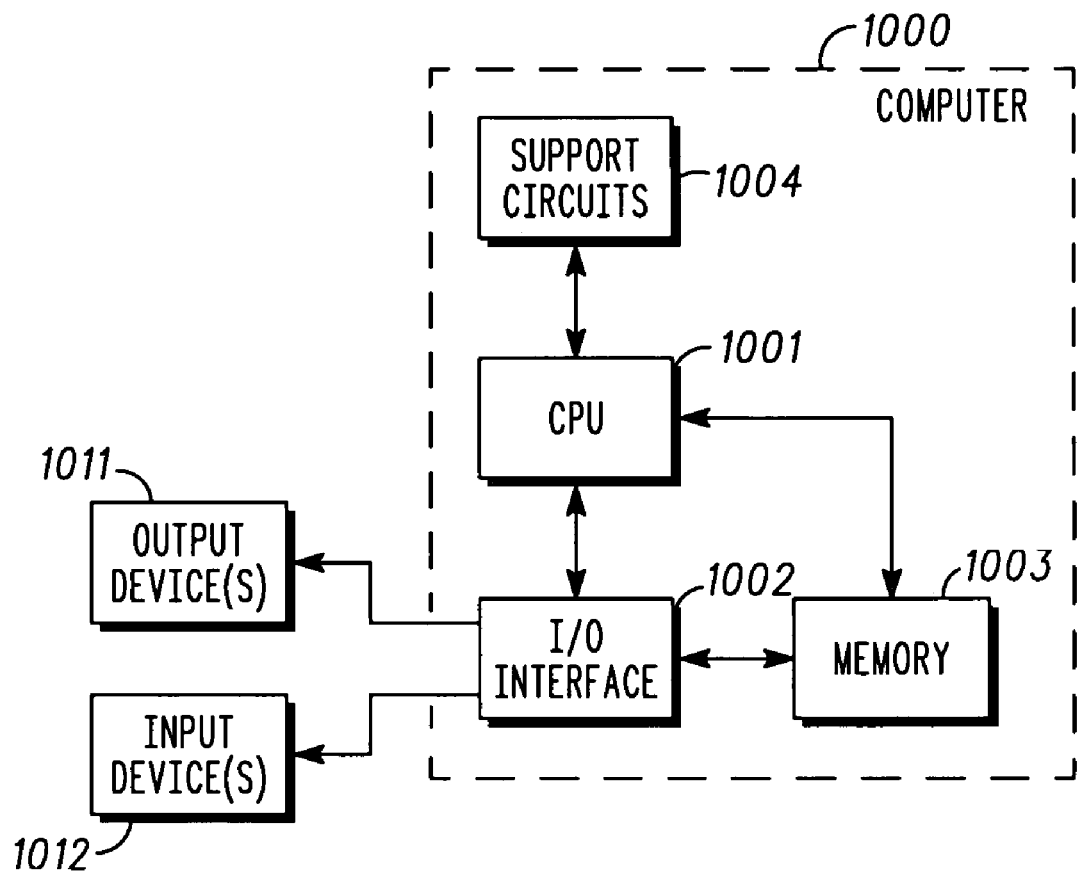
FIG. 10 is a block diagram depicting an exemplary embodiment of a computer suitable for implementing processes and methods described herein.

FIG. 10 is a block diagram depicting an exemplary embodiment of a computer 1000 suitable for implementing processes and methods described above. The computer 100 includes a central processing unit (CPU) 1001, a memory 1003, various support circuits 1004, and an I/O interface 1002. The CPU 1001 may be any type of microprocessor known in the art. The support circuits 1004 for the CPU 1002 include conventional cache, power supplies, clock circuits, data registers, I/O interfaces, and the like. The I/O interface 1002 may be directly coupled to the memory 1003 or coupled through the CPU 1001. The I/O interface 1002 may be coupled to various input devices 1012 and output devices 1011, such as a conventional keyboard, mouse, printer, display, and the like.

The memory 1003 may store all or portions of one or more programs and/or data to implement the processes and methods described above. The memory 1003 may include one or more of the following random access memory, read only memory, magneto-resistive read/write memory, optical read/write memory, cache memory, magnetic read/write memory, and the like, as well as signal-bearing media as described below. Although the invention is disclosed as being implemented as a computer executing a software program, those skilled in the art will appreciate that the invention may be implemented in hardware, software, or a combination of hardware and software. Such implementations may include a number of processors independently executing various programs and dedicated hardware, such as application specific integrated circuits (ASICs).

The processes and methods described above may be implemented as a computer readable carrier. Program(s) of the computer readable carrier define functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD). Such signal-bearing media or computer readable carriers, when carrying computer-readable instructions that direct functions of the invention, represent embodiments of the invention.

While the foregoing is directed to illustrative embodiments of the present invention, other and further embodiments of the invention may be devised without departing from the basic scope thereof, and the scope thereof is determined by the claims that follow.

The invention claimed is:

1. A method of encoding a plurality of audio/video (AV) programs for simultaneous display on a display device, comprising:
    generating at least one non-composited digital transport stream, each non-composite digital transport stream being generated by combining a plurality of AV programs into a single non-composited digital transport stream by a multiplexer;
    generating control information associated with each non-composited digital transport stream of said non-composited digital transport stream by a control information unit, and augmenting said at least one non-composited digital transport stream with control information, said control information operative to invoke simultaneous display of said plurality of AV programs on said display device; and
    transmitting said at least one non-composited digital transport stream as augmented over a digital link coupled to the display device,
    wherein the control information associates each AV program with a corresponding region on said display device to be displayed.

2. The method of claim 1, wherein said at least one non-composited digital transport stream comprises a single digital transport stream having a control packet associated with said plurality of AV programs.

3. The method of claim 2, wherein said control information comprises identification data associated with each of said plurality of AV programs, said identification data disposed within said control packet.

4. The method of claim 3, wherein said control packet comprises a program map table (PMT), and wherein said identification data comprises packet identifiers (PIDs) associated with packets defining said plurality of AV programs, said PIDs disposed within a descriptor of said PMT.

5. The method of claim 1, wherein said at least one non-composited digital transport stream comprises a single digital transport stream having a first control packet and a plurality of second control packets, each of said plurality of second control packets associated with a respective one of said plurality of AV programs.

6. The method of claim 5, wherein said control information comprises identification data associated with each of said plurality of second control packets, said identification data disposed in said first control packet.

7. The method of claim 6, wherein said first control packet comprises a program association table (PAT), wherein each of said plurality of second control packets comprises a program map table (PMT), and wherein said identification data comprises packet identifiers (PIDs) associated with said PMT of each of said plurality of second control packets, said PIDs disposed within an adaptation field of said PAT.

8. The method of claim 1, wherein said control information comprises a command having identification data associated with said plurality of AV programs.

9. The method of claim 8, wherein said command comprises an operational code to invoke said simultaneous display, and wherein said identification data comprises a plurality of pairs of source and destination plugs, each of said plurality of pairs of source and destination plugs associated with a respective one of said plurality of AV programs.

10. The method of claim 8, wherein said at least one non-composited digital transport stream comprises a plurality of digital transport streams, each of said plurality of digital transport streams associated with a respective one of said plurality of AV programs.

11. The method of claim 8, wherein said at least one non-composited digital transport stream comprises a single digital transport stream associated with said plurality of AV programs.

12. A method of decoding a non-composited digital transport stream having a plurality of audio/video (AV) programs configured for simultaneous display at a display device, comprising:
    receiving said at least one non-composited digital transport stream over a digital link coupled to a source device by an interface;
    extracting control information from said at least one non-composited digital transport stream;
    identifying said plurality of AV programs within said non-composited digital transport stream in response to said control information; and
    simultaneously displaying said plurality of AV programs as identified on the display device,
    wherein the control information associates each AV program with a corresponding region on said display device to be displayed.

13. The method of claim 12, wherein said at least one non-composited digital transport stream comprises a single digital transport stream having a control packet associated with said plurality of AV programs.

14. The method of claim 13, wherein said control information comprises identification data associated with each of said plurality of AV programs, said identification data disposed within said control packet.

15. The method of claim 14, wherein said control packet comprises a program map table (PMT), and wherein said identification data comprises packet identifiers (PIDs) associated with packets defining said plurality of AV programs, said PIDs disposed within a descriptor of said PMT.

16. The method of claim 12, wherein said at least one non-composited digital transport stream comprises a single digital transport stream having a first control packet and a plurality of second control packets, each of said plurality of second control packets associated with a respective one of said plurality of AV programs.

17. The method of claim 16, wherein said control information comprises identification data associated with each of said plurality of second control packets, said identification data disposed in said first control packet.

18. The method of claim 17, wherein said first control packet comprises a program association table (PAT), wherein each of said plurality of second control packets comprises a program map table (PMT), and wherein said identification data comprises packet identifiers (PIDs) associated with said PMT of each of said plurality of second control packets, said PIDs disposed within an adaptation field of said PAT.

19. The method of claim 12, wherein said control information comprises a command having identification data associated with said plurality of AV programs.

20. The method of claim 19, wherein said command comprises an operational code to invoke said simultaneous display, and wherein said identification data comprises a plurality of pairs of source and destination plugs, each of said plurality of pairs of source and destination plugs associated with a respective one of said plurality of AV programs.

21. The method of claim 19, wherein said at least one non-composited digital transport stream comprises a plurality of digital transport streams, each of said plurality of digital transport streams associated with a respective one of said plurality of AV programs.

22. The method of claim 19, wherein said at least one non-composited digital transport stream comprises a single digital transport stream associated with said plurality of AV programs.

23. An encoder for encoding a plurality of audio/video (AV) programs for simultaneous display on a display device, comprising:
 a multiplexer unit for generating at least one non-composited digital transport stream from said plurality of AV programs; and
 a control information unit for augmenting said at least one non-composited digital transport stream with control information, said control information operative to invoke simultaneous display of said plurality of AV programs on said display device,
 wherein the control information associates each AV program with a corresponding region on said display device to be displayed.

24. The encoder of claim 23, further comprising:
 interface circuitry for transmitting said at least one non-composited digital transport stream as augmented over a digital link coupled between said encoder and said display device.

25. A decoder for decoding at least one non-composited digital transport stream having a plurality of AV programs configured for simultaneous display on a display device, comprising:
 a control information analyzer for extracting control information from said at least one non-composited digital transport stream, said control information operative to invoke simultaneous display of said plurality of AV programs on said display device; and
 a demultiplexing unit for recovering said plurality of AV programs within said non-composited digital transport stream in response to said control information,
 wherein the control information associates each AV program with a corresponding region on said display device to be displayed.

26. The decoder of claim 25, further comprising:
 interface circuitry for receiving said at least one non-composited digital transport stream over a digital link.

27. A non-transitory computer readable medium including program instructions that instruct a computer to perform a method of:
 generating at least one non-composited digital transport stream, each non-composite digital transport stream being generated by combining a plurality of AV programs into a single non-composited digital transport stream;
 generating control information associated with each non-composited digital transport stream of said non-composited digital transport stream by a control information unit, and augmenting said at least one non-composited digital transport stream with control information, said control information operative to invoke simultaneous display of said plurality of AV programs on a display device; and
 transmitting said at least one non-composited digital transport stream as augmented over a digital link coupled to the display device,
 wherein the control information associates each AV program with a corresponding region on said display device to be displayed.

28. A non-transitory computer readable medium including program instructions that instruct a computer to perform a method of:
 receiving at least one non-composited digital transport stream over a digital link coupled to a source device;
 extracting control information from said at least one non-composited digital transport stream;
 identifying a plurality of AV programs within said non-composited digital transport stream in response to said control information; and
 simultaneously displaying said plurality of AV programs as identified on a display device,
 wherein the control information associates each AV program with a corresponding region on said display device to be displayed.

* * * * *